United States Patent [19]

Kummer

[11] 4,195,119
[45] Mar. 25, 1980

[54] FUEL CELL

[75] Inventor: Joseph T. Kummer, Ypsilanti, Mich.

[73] Assignee: Ford Motor Company, Dearborn, Mich.

[21] Appl. No.: 962,735

[22] Filed: Nov. 21, 1978

[51] Int. Cl.² ............................................. H01M 8/08
[52] U.S. Cl. ..................................... 429/38; 429/247
[58] Field of Search ..................... 429/38, 34, 46, 40, 429/41, 44, 12, 13, 14, 17, 101, 72, 247

[56] References Cited

U.S. PATENT DOCUMENTS

| | | | |
|---|---|---|---|
| 3,206,334 | 9/1965 | Ehrenfeld | 429/34 |
| 3,647,542 | 3/1972 | Berger | 429/40 X |
| 3,661,644 | 5/1972 | Arrance | 429/247 X |
| 3,855,002 | 12/1974 | Schroll | 429/41 |
| 3,871,922 | 3/1975 | Bohm et al. | 429/40 |
| 3,880,670 | 4/1975 | Shinn | 429/120 |
| 4,100,331 | 7/1978 | Fletcher et al. | 429/41 X |

Primary Examiner—Anthony Skapars
Attorney, Agent, or Firm—William E. Johnson; Keith L. Zerschling

[57] ABSTRACT

A fuel cell construction of economical design is disclosed. In the construction, a honeycomb separator is used to define a plurality of compartments which are separated from one another by a porous cell wall. Electrolyte is provided in the cell walls while alternate compartments of the cell contain either an oxidant or a fuel for the fuel cell. The cells contain suitable electrochemical catalyst materials on the walls thereof and electrode structures in the cells so that the oxidation of the fuel may take place in the electrolyte found in the cell walls in order to generate current for the cell. In accordance with preferred teachings, the separator is an extruded ceramic material such as used for the substrate of automotive catalytic converters.

3 Claims, 1 Drawing Figure

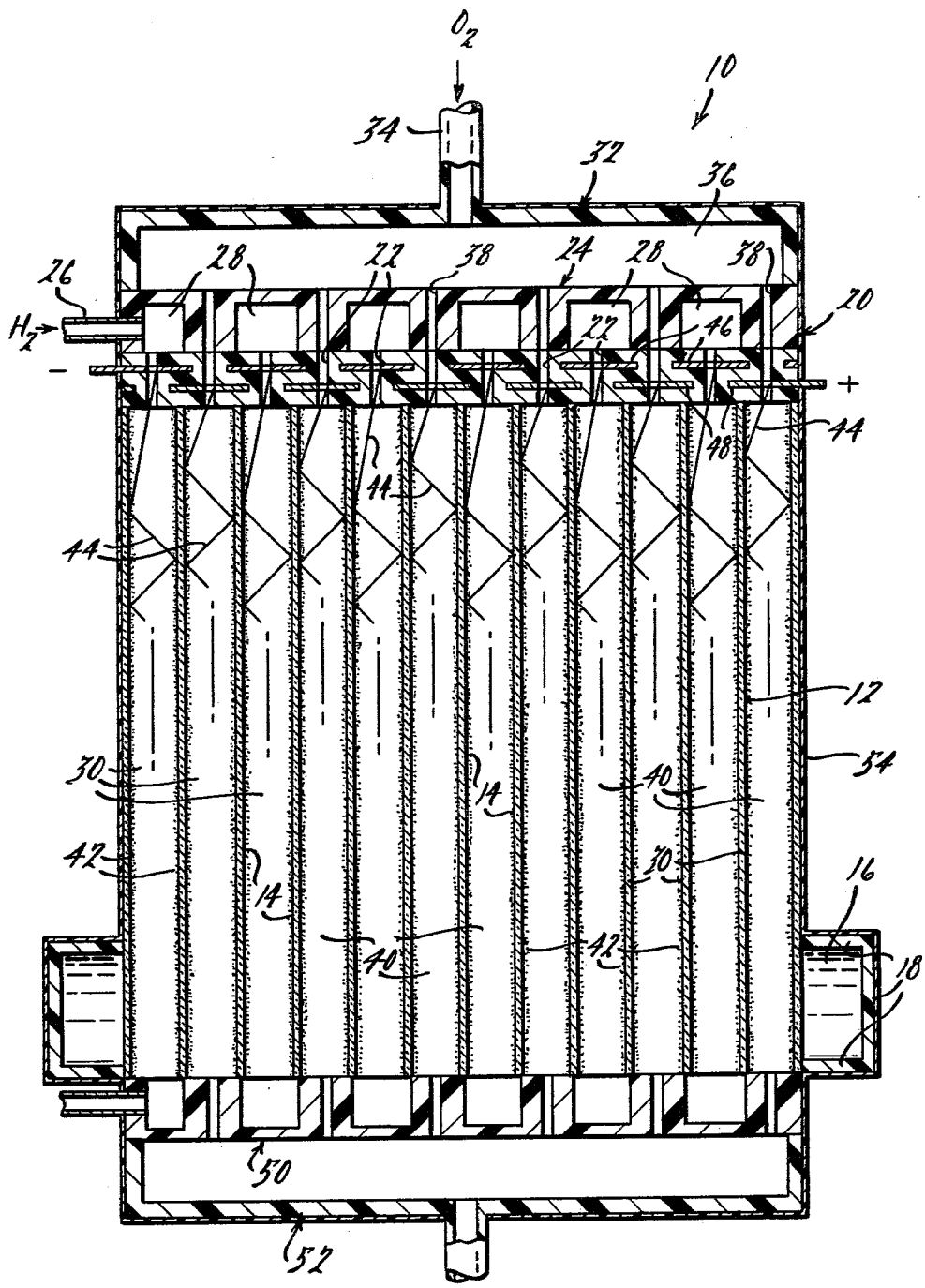

FUEL CELL

BACKGROUND OF THE INVENTION AND PRIOR ART STATEMENT

The present honeycomb structure used by the Ford Motor Company as a substrate for an auto exhaust catalyst has approximately 47 openings per square centimeter of front face surface. These substrates are manufactured from a ceramic material, essentially cordierite, and are made by an extrusion process. The resultant honeycomb has a plurality of cells which run the axial length of the honeycomb. These cells have a square cross section with an inside dimension of about 1.1 mm and are separated from one another by walls that are 150–250 micron thick. These cell walls are approximately 35–40% porous, wih the pores having an average diameter of about 10 microns.

It struck me that a honeycomb structure could be used as a separator to form an overall lightweight fuel cell. The honeycomb separator would be used in a manner such that its cells define a plurality of separate fuel compartments and oxidant compartments. With alternate cells being fuel and oxidant compartments, the structure allows for a high interface area between opposite compartments with considerable overall strength.

I am aware of U.S. Pat. No. 3,206,332 for an "Electrolytic Cell Structure". This patent shows an electrolyte-support structure in the form of a plurality of triangular-shaped parallel cells 10 of a ceramic material. The cells 10 are used to support spaced-apart electrodes, one electrode being the right hand electrode identified by the numeral 1 and the other electrode being the left hand electrode identified by the numeral 1'. The right hand electrode is the oxidant electrode, and the left hand electrode is the fuel electrode. The cells 10 are impregnated throughout their entire volume with a suitable electrolyte so that the necessary electrochemical reactions may take place to cause a current to flow to an exterior electrical load. The walls of the cells are made porous so that the oxidation products of the cell may escape therefrom.

The U.S. Pat. No. 3,206,322 does not, in any manner, propose that the electrolyte be retained only in the cell walls of the cells 10 and that the individual volume defined by the various walls of the cells be alternately formed as oxidant compartments and as fuel compartments, as I am teaching in this specification. I am unaware of any proposal to use a honeycomb separator as the device for defining the separate fuel and oxidant compartments of a fuel cell.

SUMMARY OF THE INVENTION

This application discloses a fuel cell and, more particularly, a fuel cell of high strength which may be built at a relatively low cost.

In accordance with the general teachings of this invention, the fuel cell is formed by the following structure. A honeycomb separator is provided which has a plurality of cells therein to define separate fuel compartments and oxidant compartments. The honeycomb separator is formed of a material having a porosity which allows a capillary transport therethrough of an electrolyte for the fuel cell. An electrolyte reservoir is placed in contact with at least a portion of the honeycomb separator so that the honeycomb separator may wick the electrolyte throughout its entire extent. A fuel supplying device is provided for supplying a fuel to every other cell in a checkerboard fashion thereby to define fuel compartments in the honeycomb separator.

In a similar manner, an oxidant supply device supplies oxidant to every cell not a fuel compartment thereby to define oxidant compartments in the honeycomb separator. The fuel compartments and the oxidant compartments are in a side-by-side relationship throughout the honeycomb separator. An electrode catalyst material is deposited on the walls of the honeycomb separator defining the fuel compartments and the oxidant compartments. Current carrying devices are provided in each of the fuel compartments and the oxidant compartments for providing an electric circuit to the electrode catalyst material in each of the compartments. A first current collecting terminal is connected to each of the current carrying devices located in the fuel compartments of the honeycomb separator to provide a first pole for the fuel cell. In a like manner, a second current collecting terminal is connected to each of the current carrying devices located in the oxidant compartments of the honeycomb separator to provide a second pole for the fuel cell. An exhaust device is provided for removing excess fuel and oxidant respectively from the fuel compartments and the oxidant compartments of the honeycomb separator, as well as oxidation products.

In such a manner, a fuel cell of relatively inexpensive construction can be made. The fuel cell does have the characteristic of excellent strength because of the use of the honeycomb separator.

In accordance with a preferred embodiment of this invention, the honeycomb separator is formed from a separator material such as used to form the substrate for a catalytic device associated with an automobile engine.

BRIEF DESCRIPTION OF THE DRAWINGS

The novel features that are considered characteristic of the invention are set forth with particularity in the appended claims. The invention, itself, however, both as to its organization and its method of operation, together with additional objects and advantages thereof, will best be understood from the following description of the specific embodiment when read in conjunction with the accompanying drawing which is an elevational view, mostly in cross section, of a fuel cell constructed in accordance with the teachings of this invention.

DESCRIPTION OF THE PREFERRED EMBODIMENT

A fuel cell, generally identified by the numeral 10, is shown in the associated drawing. This fuel cell includes a honeycomb separator 12 having a plurality of walls 14—14 throughout the entire extent thereof. The drawing shows only the first row of wall, other rows being in front and behind the row shown. In accordance with the teachings of this invention, the walls of the honeycomb separator are formed of a material having a porosity which allows a capillary transport therethrough of an electrolyte.

In accordance with the teachings of the preferred embodiment of this invention, the honeycomb separator 12 is a substrate such as is used for exhaust gas catalysts for automotive engines. A particular type of substrate manufactured by an extrusion process would have 47 cells per square centimeter of front face. The individual cells are the volumes defined between the cell walls 14—14. The cells run the axial length of the honeycomb separator and have a square cross section with an inside dimension of 1.1 mm, and are separated from one another by the walls 14—14 that are 150-250 microns thick with a porosity in the range of 35-40%. The pore diameter for the porosity is generally in the range of about 10 microns. Normally, these honeycomb separators are made from a ceramic material such as cordierite.

In general, however, the requirements of the honeycomb separator are that it be made from a material having a porosity sufficient to permit the wicking of an electrolyte therethrough. The material must also be resistant to any chemical attack thereon by the electrolyte. Other materials which may be suitable for the honeycomb separator are materials such as plastics, such as Teflon. Also, the cell density and wall thickness may be varied to achieve the electrical characteristics desired from the particular fuel cell.

An electrolyte reservoir 16 is defined by electrolyte confining walls 18. In accordance with the preferred embodiment, the electrolyte reservoir 16 contains a sulfuric acid electrolyte material, for example, a sulfuric acid having an acid concentration of 35 weight percent. The porosity of the honeycomb separator 12 permits a wicking of the electrolyte material from the reservoir throughout the honeycomb separator so that all of the cell walls 14—14 contain the electrolyte material generally throughout their entire extent.

On top of the honeycomb separator 12 there is provided a current collecting structure, generally identified by the numeral 20. The full construction of this structure will be defined at a later time. It is only of interest to indicate now that this structure has a plurality of passageways 22-22 extending therethrough, each passageway being associated with a volume defined between the walls 14—14 of the honeycomb separator 12.

A fuel supply header, generally designated by the numeral 24, is located on top of the current collecting structure 20. The fuel supply header 24 has an inlet pipe 26 through which a fuel, such as hydrogen, is supplied. The inlet pipe is connected to a plurality of distribution chambers 28, which chambers are connected by means of alternate passageways 22—22 of the current collecting structure 20 to alternate cells of the honeycomb separator 12 which are hereinafter referred to as fuel compartments 30—30.

In a similar manner, an oxidant supply header, generally identified by the numeral 32, is also provided. This header has an inlet pipe 34 for supplying an oxidant such as oxygen to a distribution chamber 36. The distribution chamber 36 of the oxidant supply header 34 is connected by a plurality of passageways 38 formed in the fuel supply header 24 and alternate ones of the plurality of passageways 22—22 formed in the current collecting structure 20 to compartments in the honeycomb separator which are hereinafter identified as oxidant compartments 40—40.

In such a manner, fuel compartments 30—30 and oxidant compartments 40—40 are located in a checkerboard fashion next to one another throughout the entire extent of the honeycomb separator 12. The fuel compartments are filled from top to bottom with a fuel such as the mentioned hydrogen, while the oxidant compartments are filled from top to bottom with an oxidant material such as the mentioned oxygen. The compartments are separated by the walls 14 which contain the electrolyte material which permits generation of a current by means of an oxidation taking place of the fuel in the medium of the electrolyte.

In order to permit the carrying out of the mentioned reaction, it is necessary that the fuel compartment walls and the oxidant compartment walls be lined with a suitable electrode catalyst material. In accordance with the teachings of the preferred embodiment of this invention, the walls of the fuel compartments 30—30 and oxidant compartments 40—40 are coated with an electrode catalyst material 42.

In accordance with the teachings of this disclosure, the electrode catalyst 42 is applied as a washcoat to the different compartments. A different catalyst material may be applied to alternate compartments by use of a suitable plug to first plug off one set of compartments, while the other is being treated, and then a reversing of that procedure. For example, the fuel compartment may be treated with an electrode catalyst material such as carbon and platinum, while the oxidant compartments are treated with a material such as carbon and platinum.

The porosity of the walls 14—14 of the honeycomb separator 12 dictate the particular size of the catalyst material which may be used therein. If the electrode catalyst material 42 is too small, it can penetrate from one compartment to the other thereby setting up a partial short of the fuel cell. This is undesireable and must be prevented. One way of accomplishing this is by the use of dual porosity walls. The particular structure can be formed by making the original walls 14—14 of the honeycomb separator so as to have a small pore size and, thereafter, applying a coarse ceramic washcoat material thereto followed by a resintering of the entire body. This action gives the wall an outer large pore size with a small interior pore size, the outer pore being used to accommodate and hold a large size particle of the electrode catalyst material.

Electrical contact is made to the electrode catalyst 42 in each of the fuel compartments 30—30 and oxidant compartments 40—40 by means of a small wire 44—44 located in each of the compartments. This small wire may be made from a material such as nickel.

As previously mentioned, the cell of this structure includes the current collecting structure 20. This structure includes an upper current collecting terminal 46 and a lower current collecting terminal 48. The upper terminal is connected by means of the small wires 44—44 to the electrode catalyst 42—42 located in the fuel compartments 30—30. In a similar manner, the lower terminal 48 is connected by the small wires 44—44 to the electrode catalyst 42—42 located in each of the oxidant compartments 40—40. In this manner, the upper terminal and the lower terminal provide the two poles of the cells 10 which may be connected to a load such that the power generated within the fuel cell by oxidation of the fuel may be consumed by the load to accomplish a desired function.

A fuel exhaust header 50 is provided to remove any extra fuel from the fuel compartments 30—30. The construction of the fuel exhaust header 50 is similar to the construction of the fuel supply header 24 and no further discussion thereof will be undertaken herein. The fuel exhausted from the cell may be passed through any suitable treatment device to remove extra moisture therefrom and the fuel thereafter returned to the device which supplies the fuel to the inlet pipe 26 of the fuel supply header 24.

In a similar manner, an oxidant exhaust header 52 is also provided to remove excess oxidant from the oxidant compartments 40—40. The oxidant may also be recycled to the inlet pipe 34 after it has been dried. During the reactions of a fuel cell, moisture is generated and this should be removed from the exhausted fuel and oxidant materials if they are to be recycled.

The exterior surface of the cell 10 may be sealed with a plastic sealant 54 in order to produce a finished fuel cell structure.

While a preferred embodiment of the invention has been illustrated and described, it will be obvious to those skilled in the art that various changes and modifications may be made without departing from the invention, and it is intended to cover in the appended claims all such modifications and equivalents as fall within the true spirit and scope of this invention.

What is claimed is:

1. A hydrogen/oxygen fuel cell comprising:
   a honeycomb separator having a plurality of walls which form cells thereby to define a plurality of separate hydrogen compartments and oxygen compartments, said walls of said honeycomb separator being formed of a material having a porosity which allows a capillary transport therethrough of an electrolyte;
   an electrolyte reservoir in contact with at least a portion of said honeycomb separator;
   a hydrogen/oxygen fuel cell electrolyte in said reservoir, said hydrogen/oxygen fuel cell electrolyte being wicked into said walls of said honeycomb separator;
   hydrogen supply means for supplying hydrogen to every other cell in a checkerboard fashion thereby to define hydrogen compartments in said honeycomb separator;
   oxygen supply means for supplying oxygen to every cell not a hydrogen compartment thereby to define oxygen compartments in said honeycomb separator, said hydrogen compartments and said oxygen compartments being generally in a side-by-side relationship throughout said honeycomb separator;
   electrode catalyst material deposited on said walls of said honeycomb separator defining said hydrogen compartments and said oxygen compartments;
   current carrying means in each of said hydrogen compartments and said oxygen compartments for providing an electrical circuit to said electrode catalyst material in each of said compartments;
   a first current collecting terminal means connected to each of said current carrying means located in said hydrogen compartments of said honeycomb separator to provide a first pole for said fuel cell;
   a second current collecting terminal means connected to each of said current carrying means located in said oxygen compartments of said honeycomb separator to provide a second pole for said fuel cell; and
   exhaust means for removing oxidation products and excess hydrogen and oxygen respectively from said hydrogen compartments and said oxygen compartments.

2. The fuel cell of claim 1 wherein: said honeycomb separator is formed of a ceramic material.

3. The fuel cell of claim 2 wherein: said ceramic material is cordierite.

* * * * *